United States Patent
Lee et al.

(10) Patent No.: US 11,905,985 B2
(45) Date of Patent: Feb. 20, 2024

(54) SYSTEMS AND METHODS FOR MISALIGNMENT ADJUSTMENT UTILIZING DOUBLE ECCENTRIC BUSHINGS

(71) Applicant: GOODRICH CORPORATION, Charlotte, NC (US)

(72) Inventors: Brandon Lee, Jamestown, ND (US); Wallace Harold Larson, Jamestown, ND (US); Zachary Meyer, Jamestown, ND (US); Michael A. Schulz, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/674,404

(22) Filed: Feb. 17, 2022

(65) Prior Publication Data
US 2023/0258231 A1    Aug. 17, 2023

(51) Int. Cl.
*F16B 21/18* (2006.01)
*F16B 5/02* (2006.01)
*F16B 19/02* (2006.01)

(52) U.S. Cl.
CPC ............ *F16B 21/186* (2013.01); *F16B 5/025* (2013.01); *F16B 5/0225* (2013.01); *F16B 19/02* (2013.01)

(58) Field of Classification Search
CPC .......... F16B 5/0216–0225; F16B 5/025; F16B 19/02; F16B 21/18; F16B 21/186
See application file for complete search history.

(56) References Cited

U.S. PATENT DOCUMENTS

| 3,638,983 | A | 2/1972 | Flournoy et al. |
|---|---|---|---|
| 4,252,338 | A | 2/1981 | Ingalls et al. |
| 4,420,272 | A | 12/1983 | Ingalls et al. |
| 4,613,000 | A | 9/1986 | Moore |
| 7,406,777 | B2 | 8/2008 | Christian et al. |
| 7,857,565 | B2 * | 12/2010 | Martinson ............. F16B 5/0225 411/533 |

(Continued)

FOREIGN PATENT DOCUMENTS

| EP | 0692642 | 2/1999 |
|---|---|---|
| EP | 1596075 | 8/2007 |

OTHER PUBLICATIONS

European Patent Office, European Search Report dated Jun. 5, 2023 in Application No. 22211798.8.

*Primary Examiner* — Matthew P Travers
(74) *Attorney, Agent, or Firm* — SNELL & WILMER L.L.P.

(57) ABSTRACT

A double eccentric bushing arrangement comprises a first eccentric bushing comprising a first eccentric aperture, a second eccentric bushing comprising a second eccentric aperture, a fastener, a washer configured to be received around a portion of the second eccentric bushing, and a snap ring configured to be received around a portion of the second eccentric bushing to secure the washer in an installed position. The first eccentric bushing is configured to receive the second eccentric bushing in the first eccentric aperture. The second eccentric bushing is configured to receive the fastener in the second eccentric aperture. The first eccentric bushing is rotatable with respect to the second eccentric bushing to adjust a position of the fastener with respect to an adjacent component to which the fastener is being attached.

17 Claims, 6 Drawing Sheets

(56) References Cited

U.S. PATENT DOCUMENTS

| | | |
|---|---|---|
| 8,226,320 B2 | 7/2012 | Steinke |
| 10,001,158 B2 | 6/2018 | Grether et al. |
| 10,906,639 B2 | 2/2021 | Dunn et al. |
| 10,989,333 B2 | 4/2021 | Bailey |
| 2002/0133950 A1 | 9/2002 | Bullard |
| 2016/0258460 A1* | 9/2016 | Gorodinsky .......... F16B 5/0225 |
| 2020/0023936 A1 | 1/2020 | Gardner |

* cited by examiner

SYSTEMS AND METHODS FOR MISALIGNMENT ADJUSTMENT UTILIZING DOUBLE ECCENTRIC BUSHINGS

FIELD

In general, the arrangements disclosed herein relate to systems and methods for mounting components. More specifically, they relate to systems and methods for attaching multi-hole components.

BACKGROUND

Multi-hole components are coupled to adjacent structures using various methods. Typically, a first hole of the component is aligned with a first bolt and a second hole of the component is aligned with a second bolt. Therefore, it is desirable to manufacture corresponding holes to align with each other to ensure the parts fit together. Such arrangements may need tight tolerances to ensure that the holes align. One way around tight tolerances is to manufacture over-sized bolt holes to ensure sufficient clearance to compensate for misalignment of bolt axes; bolts are then inserted and tightened with the component in the correct position. Another way, which also provides adjustment of a part, is to manufacture elongated slots into which bolts are inserted and tightened with the component at the correct position. Both these arrangements are vulnerable to potentially-undesirable free-play in the event that bolt preload is not properly achieved during installation, or is lost during service.

SUMMARY

A fastener aligning joint arrangement is disclosed, comprising a first component comprising an oversized aperture, a first eccentric bushing comprising a first eccentric aperture, the first component is configured to receive the first eccentric bushing in the oversized aperture, a second eccentric bushing comprising a second eccentric aperture, the first eccentric bushing is configured to receive the second eccentric bushing in the first eccentric aperture, a fastener, the second eccentric bushing is configured to receive the fastener in the second eccentric aperture, a washer configured to be received around a portion of the second eccentric bushing, and a snap ring configured to be received around the portion of the second eccentric bushing to secure the washer in an installed position.

In various embodiments, rotation of at least one of the first eccentric bushing with respect to the first component or the second eccentric bushing with respect to the first eccentric bushing is configured to align the fastener within the oversized aperture.

In various embodiments, the first eccentric bushing comprises a first head flange and a first shaft portion extending from the first head flange, wherein the first eccentric aperture extends through the first head flange and the first shaft portion.

In various embodiments, the second eccentric bushing comprises a second head flange and a second shaft portion extending from the second head flange, wherein the second eccentric aperture extends through the second head flange and the second shaft portion.

In various embodiments, the fastener aligning joint arrangement further comprises a second component comprising a fastening feature, wherein rotation of at least one of the first eccentric bushing with respect to the first component or the second eccentric bushing with respect to the first eccentric bushing is configured to align the fastener with the fastening feature.

In various embodiments, the second component comprises a depression and the snap ring and the washer are disposed in the depression.

In various embodiments, the fastener is configured to be threadingly coupled to the fastening feature.

In various embodiments, the fastener is configured to be tightened to compress the first head flange, the second head flange, and the first component between the fastener and the second component.

In various embodiments, the first head flange of the first eccentric bushing comprises a pair of parallel opposing surfaces configured to receive a first tool for at least one of securing the first eccentric bushing in a first given rotational position or rotating the first eccentric bushing between a first rotational position and a second rotational position.

In various embodiments, the second head flange of the second eccentric bushing comprises a slot configured to receive a second tool for at least one of securing the second eccentric bushing in a second given rotational position or rotating the second eccentric bushing between a third rotational position and a fourth rotational position.

A double eccentric bushing arrangement is disclosed, comprising a first eccentric bushing comprising a first eccentric aperture, a second eccentric bushing comprising a second eccentric aperture, the first eccentric bushing is configured to receive the second eccentric bushing in the first eccentric aperture, a fastener, the second eccentric bushing is configured to receive the fastener in the second eccentric aperture, a washer configured to be received around a portion of the second eccentric bushing, and a snap ring configured to be received around the portion of the second eccentric bushing to secure the washer in an installed position.

In various embodiments, rotation of the first eccentric bushing with respect to the second eccentric bushing is configured to align the second eccentric aperture with a fastening feature of an adjacent component.

In various embodiments, the first eccentric bushing comprises a first head flange and a first shaft portion extending from the first head flange, wherein the first eccentric aperture extends through the first head flange and the first shaft portion.

In various embodiments, the second eccentric bushing comprises a second head flange and a second shaft portion extending from the second head flange, wherein the second eccentric aperture extends through the second head flange and the second shaft portion.

In various embodiments, the first head flange of the first eccentric bushing comprises a pair of parallel opposing surfaces configured to receive a first tool for at least one of securing the first eccentric bushing in a first given rotational position or rotating the first eccentric bushing between a first rotational position and a second rotational position.

In various embodiments, the second head flange of the second eccentric bushing comprises a slot configured to receive a second tool for at least one of securing the second eccentric bushing in a second given rotational position or rotating the second eccentric bushing between a third rotational position and a fourth rotational position.

In various embodiments, the second shaft portion comprises a circumferential groove configured to receive the snap ring.

A method for installing a component is disclosed, comprising disposing a first eccentric bushing comprising a first eccentric aperture into a first aperture disposed in the component, disposing a second eccentric bushing comprising a second eccentric aperture into the first eccentric aperture, disposing a washer around the second eccentric bushing, disposing a snap ring around the second eccentric bushing to lock the washer in an installed position, rotating the first eccentric bushing with respect to the second eccentric bushing to align the second eccentric aperture with a fastening feature of a support structure, and disposing a fastener through the second eccentric aperture to couple the fastener to the support structure via the fastening feature.

In various embodiments, rotating the first eccentric bushing with respect to the second eccentric bushing comprises moving a first tool around a first head flange of the first eccentric bushing and moving a second tool into a slot disposed in a second head flange of the second eccentric bushing.

In various embodiments, the first head flange comprises a pair of opposing parallel surfaces configured to engage the first tool.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems and methods for misalignment adjustment for fasteners coupled between two members, such as for bolted joints for panel members of an aircraft. While various details are included herein pertaining to aircraft components, the systems and methods disclosed herein can be applied to any component where bolted joint misalignment adjustment is desired.

Systems and methods of the present disclosure provide a step-less adjustment arrangement for achieving a desired fastener position. A double eccentric bushing arrangement is provided, in various embodiments, wherein rotation of an outer eccentric bushing with respect to an inner eccentric bushing and the first component aligns a fastener with an adjacent support structure to which the first component is being attached. Systems and methods of the present disclosure provide the ability to maintain tight clearances in a multi-hole assembly, thereby reducing potential of excessive free play. Systems and methods of the present disclosure provide the ability to retrofit parts in service where holes in one component may have significant variation in distance between said holes.

Figure 1A:
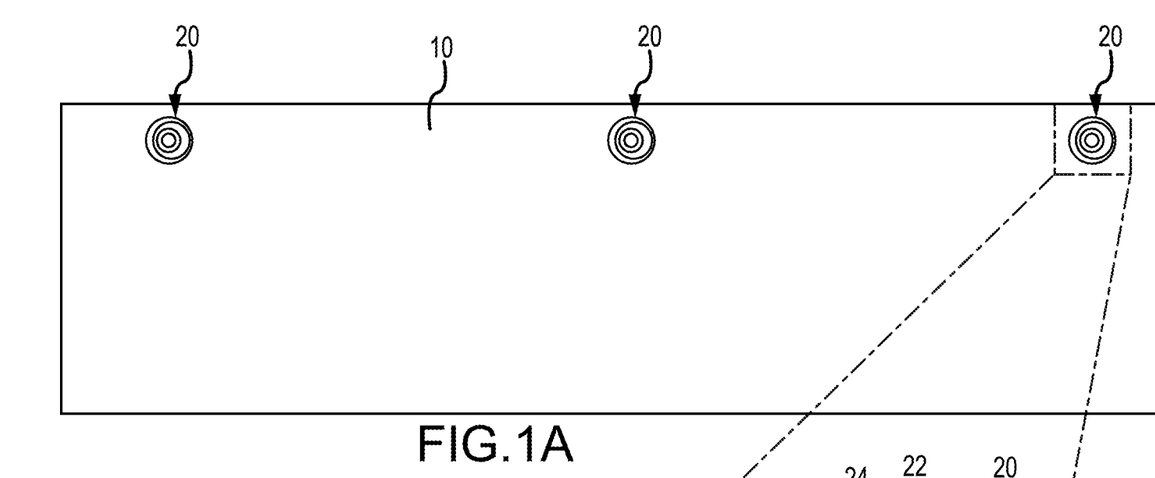
FIG. 1A illustrates a first component comprising a plurality of fastener aligning joints comprising an inner eccentric bushing and an outer eccentric bushing, in accordance with various embodiments.
Figure 1B:
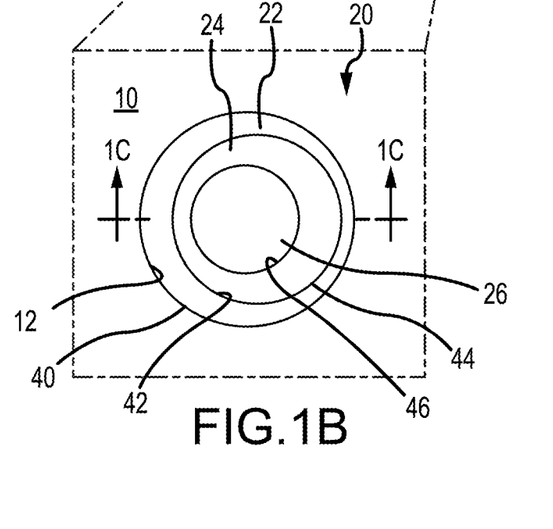
FIG. 1B illustrates an enlarged view of the fastener aligning joint of FIG. 1A, in accordance with various embodiments.

With reference to FIG. 1A, a first component 10 (also referred to herein as a panel member) is illustrated installed over a second component (also referred to herein as a support structure) via a plurality of fastener aligning joints 20, each comprising double eccentric bushings, in accordance with various embodiments. Although described herein with respect to a panel member 10, fastener aligning joints 20 may be utilized for any suitable component for which misalignment adjustment is desired during installation. With reference to FIG. 1B, and continued reference to FIG. 1A, fastener aligning joint 20 generally comprises a second eccentric bushing 24 (also referred to herein as an inner eccentric bushing), a first eccentric bushing 22 (also referred to herein as an outer eccentric bushing), and a fastener 26. Second eccentric bushing 24, first eccentric bushing 22, and/or a fastener 26 may comprise any suitable material capable of transferring loads (e.g., tension, shear, bending) experienced by the fastener aligning joint 20 depending on the desired application, including but not limited to hard plastics, metals, metal alloys, and composites.

Panel member 10 may be mounted to a support structure 30 (see FIG. 1C) via fastener aligning joints 20. It is desirable to align fastener 26 with fastening feature 32, (also referred to herein as an aperture or a fastening aperture) of support structure 30. In various embodiments, fastener 26 is a bolt or screw and fastening feature 32 is a threaded aperture, wherein the fastener 26 is threadingly coupled to the fastening feature 32. In some cases, one member of the joint (e.g., panel member 10 and/or support structure 30) may be manufactured to positional tolerances that do not allow fasteners to be installed between both members of the joint. In these cases, it may be desirable to have the ability to adjust for misalignment between the members while still maintaining close fits. In this regard, aperture 12 of panel member 10 may be oversized (i.e., an oversized aperture), relative to aperture 32, such that second eccentric bushing 24, first eccentric bushing 22, and fastener 26 fit at least partially within aperture 12. In this manner, fastener 26 may be aligned with aperture 32 in response to rotation of second eccentric bushing 24 and/or first eccentric bushing 22. Stated differently, rotation of second eccentric bushing 24 and/or first eccentric bushing 22 may align fastener 26 within oversized aperture 12 to achieve a desired alignment with aperture 32.

In various embodiments, first eccentric bushing 22 may be configured to fit within an aperture 12 disposed in panel member 10. Aperture 12 may be circular in geometry. First eccentric bushing 22 may comprise a circular outer diameter surface 40 and an eccentric aperture 42 (also referred to herein as a first eccentric aperture). First eccentric bushing 22 may be configured to fit snuggly within aperture 12 (i.e., the outer diameter surface 40 may contact the inner diameter surface of aperture 12) while still allowing first eccentric bushing 22 to rotate within aperture 12 with respect to panel member 10. As used herein, "to fit snuggly" means the outer diameter of an inner member (e.g., first eccentric bushing 22) is between 97% and 100% of the diameter of the aperture into which the inner member is placed (e.g., aperture 12). Eccentric aperture 42 may be circular in geometry. Eccentric aperture 42 may be configured to receive second eccentric bushing 24.

Second eccentric bushing 24 may be configured to fit within eccentric aperture 42 disposed in second eccentric bushing 24. Second eccentric bushing 24 may comprise a circular outer diameter surface 44 and an eccentric aperture 46 (also referred to herein as a second eccentric aperture). Second eccentric bushing 24 may be configured to fit snuggly within eccentric aperture 42 (i.e., the outer diameter surface 44 may contact the inner diameter surface of aperture 42) while still allowing second eccentric bushing 24 to rotate within eccentric aperture 42 with respect to first eccentric bushing 22. Eccentric aperture 46 may be circular in geometry. Eccentric aperture 46 may be configured to receive fastener 26.

Figure 1C:
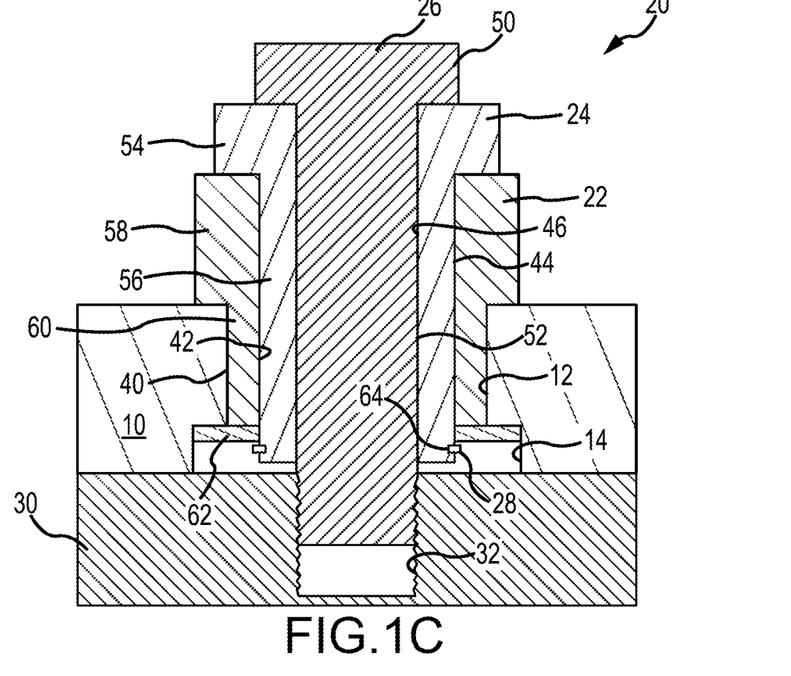
FIG. 1C illustrates a section view of the fastener aligning joint of FIG. 1A, in accordance with various embodiments.
Figure 1D:
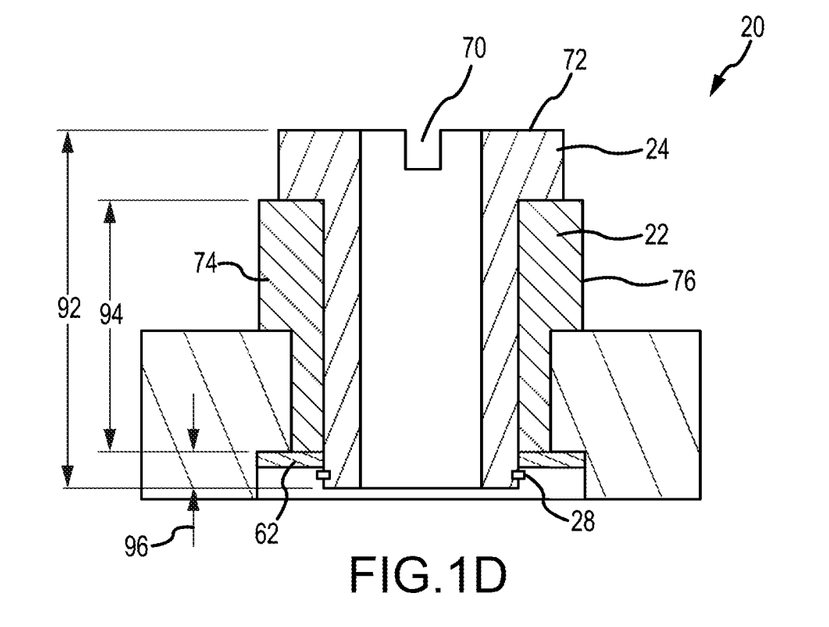
FIG. 1D illustrates a section view of the fastener aligning joint of FIG. 1C with a fastener and second component omitted for ease of illustration, in accordance with various embodiments.

With combined reference to FIG. 1C and FIG. 1D, section views of fastener aligning joint 20 are illustrated, in accordance with various embodiments. Fastener 26 and support structure 30 are omitted in FIG. 1D for clarity purposes.

Referring now to FIG. 1C and FIG. 1D, and with continued reference to FIG. 1A and FIG. 1B, the inner diameter surface of aperture 12 may be complementary to the outer diameter surface 40 of first eccentric bushing 22. First eccentric bushing 22 may be configured to rotate within, and with respect to, panel member 10. The diameter of aperture 12 may be substantially equal to or slightly greater than the outer diameter of first eccentric bushing 22. In various embodiments, the diameter of aperture 12 is between zero and ten thousands of an inch (between 0 mm and 0.254 mm) greater than the outer diameter surface 40 of first eccentric bushing 22. In various embodiments, the diameter of aperture 12 is between one tenth of a thousandth inch and four thousands of an inch (between 0.00254 mm and 0.1016 mm) greater than the outer diameter surface 40 of first eccentric bushing 22. In this manner, lateral movement or "play" of first eccentric bushing 22 within panel member 10 is mitigated, while still allowing first eccentric bushing 22 to rotate about its longitudinal axis within panel member 10.

The inner diameter surface of eccentric aperture 42 may be complementary to the outer diameter surface 44 of second eccentric bushing 24. Second eccentric bushing 24 may be configured to rotate within, and with respect to, first eccentric bushing 22. The diameter of eccentric aperture 42 may be substantially equal to or slightly greater than the outer diameter of second eccentric bushing 24. In various embodiments, the diameter of eccentric aperture 42 is between zero and ten thousands of an inch (between 0 mm and 0.254 mm) greater than the outer diameter surface 44 of second eccentric bushing 24. In various embodiments, the diameter of eccentric aperture 42 is between one tenth of a thousandth inch and four thousands of an inch (between 0.00254 mm and 0.1016 mm) greater than the outer diameter surface 44 of second eccentric bushing 24. In this manner, lateral movement or "play" of second eccentric bushing 24 within first eccentric bushing 22 is mitigated, while still allowing second eccentric bushing 24 to rotate about its longitudinal axis within first eccentric bushing 22.

Fastener 26 may extend through aperture 46. The diameter of aperture 46 may be substantially equal to or slightly greater than the outer diameter of fastener 26. In this manner, movement or "play" of second eccentric bushing 24 about fastener 26 is mitigated.

With continued reference to FIG. 1C, fastener 26 is illustrated aligned with, and coupled to, aperture 32 of support structure 30. Fastener 26 may comprise a head flange 50 configured to abut second eccentric bushing 24 and a shaft portion 52 configured to extend through second eccentric bushing 24. Likewise, second eccentric bushing 24 may comprise a head flange 54 (also referred to herein as a second head flange) configured to abut first eccentric bushing 22 and a shaft portion 56 configured to extend through first eccentric bushing 22. Likewise, first eccentric bushing 22 may comprise a head flange 58 (also referred to herein as a first head flange) configured to abut panel member 10 and a shaft portion 60 configured to extend at least partially into or through panel member 10.

In various embodiments, fastener aligning joint 20 further comprises a washer 62 configured to surround shaft portion 56 of second eccentric bushing 24. Washer 62 may be disposed opposite shaft portion 56 from head flange 54. Fastener aligning joint 20 may further comprise a snap ring 28 configured to "snap" into, or be at least partially disposed in, a circumferential groove 64 disposed in shaft portion 56 of second eccentric bushing 24. Snap ring 28 may lock second eccentric bushing 24 in aperture 12 (i.e., prevent second eccentric bushing 24 from exiting aperture 12). For example, in response to an axial force being exerted on second eccentric bushing 24, snap ring 28 may transfer a force through washer 62 and into panel member 10 to secure second eccentric bushing 24 in place and against relative axial movement with respect to panel member 10, while still allowing rotational movement of second eccentric bushing 24 with respect to first eccentric bushing 22 and panel member 10. In various embodiments, panel member 10 comprises a depression or groove 14 configured to receive washer 62 so that washer 62 and second eccentric bushing 24 are recessed within panel member 10.

With reference to FIG. 1D, and with continued reference to FIG. 1A through FIG. 1C, second eccentric bushing 24 comprises an overall length 92 and first eccentric bushing 22 comprises an overall length 94. In various embodiments, the overall length 92 is greater than the overall length 94 so that head flange 54 rests against the axially facing end surface of head flange 58 and also so that the opposite end of second eccentric bushing 24 extends from first eccentric bushing 22 to accommodate washer 62 and snap ring 28. In this regard, the end of shaft portion 56 may extend from shaft portion 60 by a distance 96.

The axial thickness of head flange 58 and head flange 54 may be relatively thin compared to conventional fasteners, such as conventional bolts or nuts for example. In this regard, it tends to be difficult to simultaneously secure first eccentric bushing 22 and second eccentric bushing 24 using conventional methods. In this regard, first eccentric bushing 22 may comprise a first adjustment feature (e.g., opposing parallel surfaces) and second eccentric bushing 24 may comprise a second adjustment feature (e.g., an elongated groove or slot) which is different from the first adjustment feature to allow for two different tools to be simultaneously secured to first eccentric bushing 22 and second eccentric bushing 24 for reliable rotational adjustment thereof.

In various embodiments, head flange 58 of first eccentric bushing 22 comprises opposing parallel surfaces, for example first parallel surface 74 and second parallel surface 76, facing radially outward and configured to accommodate, or receive, a first tool (e.g., an end wrench or the like) which can be used to either secure first eccentric bushing 22 in a given rotational position or rotate first eccentric bushing 22 from a first rotational position to a second rotational position, or both. First parallel surface 74 and second parallel surface 76 may be used to provide a mechanical advantage in turning first eccentric bushing 22. In various embodiments, second eccentric bushing 24 comprises a groove 70 that traverses the end 72 of head flange 54. Groove 70 may be configured to accommodate, or receive, a second tool (e.g., a flathead screwdriver or the like) which can be used to either secure second eccentric bushing 24 in a given rotational position or rotate second eccentric bushing 24 from a first rotational position to a second rotational position, or both. Groove 70 may be used to provide a mechanical advantage in turning second eccentric bushing 24. Groove 70 may extend through aperture 46, dividing groove 70 into two distinct groove portions disposed at opposite sides of aperture 46. First eccentric bushing 22 and second eccentric bushing 24 may simultaneously be secured by the first tool and the second tool, respectively, to allow for precise rotational positioning of the eccentric bushings 22, 24 where one eccentric bushing can be rotated while securing the other eccentric bushing, from rotation, in a desired position. In various embodiments, both eccentric bushings 22, 24 may be simultaneously rotated to a desired position by the first and second tools.

With respect to FIG. 2A through FIG. 2D, elements with like element numbering, as depicted in FIG. 1A through FIG. 1D, are intended to be the same and will not necessarily be repeated for the sake of clarity.

Figure 2A:
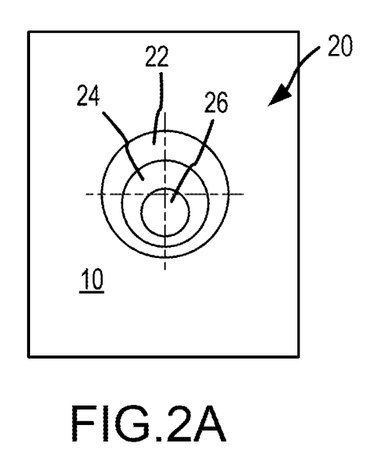
FIG. 2A, FIG. 2B, FIG. 2C, and FIG. 2D illustrate the fastener aligning joint arrangement of FIG. 1B at various angular positions, in accordance with various embodiments.

With reference to FIG. 2A, fastener aligning joint 20 is illustrated with the fastener 26 located at a first maximum position or adjustment (i.e., the lowest adjustment in FIG. 2A). Fastener 26 may be at the illustrated first maximum position in response to first eccentric bushing 22 being rotated with respect to second eccentric bushing 24 such that a location of minimum wall thickness of the first eccentric bushing 22 is circumferentially aligned with and in contact with a location of minimum wall thickness of the second eccentric bushing 24, in accordance with various embodiments.

Figure 2B:
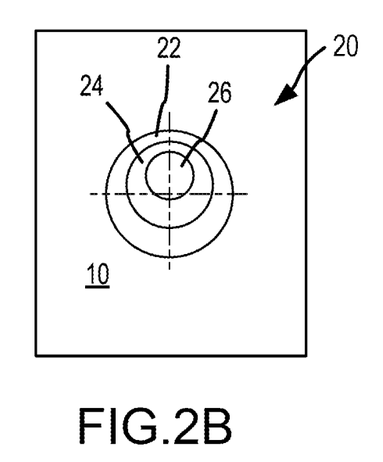

With reference to FIG. 2B, fastener aligning joint 20 is illustrated with the fastener 26 located at a second maximum position. In the illustrated embodiment, fastener aligning joint 20 is rotated in an opposite direction as depicted in FIG. 2A.

Figure 2C:
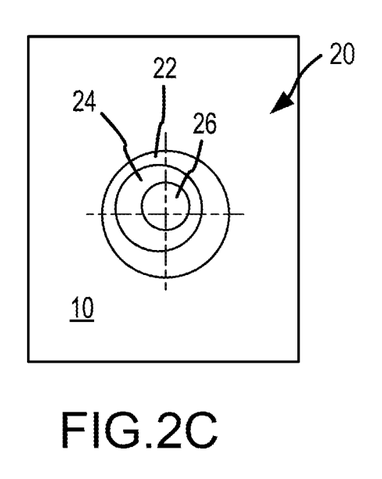

With reference to FIG. 2C, fastener aligning joint 20 is illustrated with the eccentric bushings 22, 24 rotated to a first intermediate angular position.

Figure 2D:
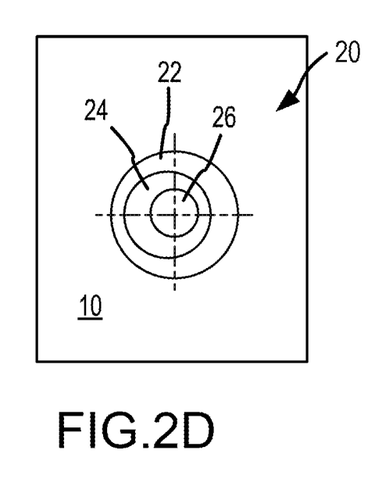

With reference to FIG. 2D, fastener aligning joint 20 is illustrated with the eccentric bushings 22, 24 rotated to a second intermediate angular position. In the depicted second intermediate angular positions, first eccentric bushing 22 is rotated with respect to second eccentric bushing 24 such that the location of minimum wall thickness of the first eccentric bushing 22 is disposed opposite fastener 26 from the location of minimum wall thickness of the second eccentric bushing 24, in accordance with various embodiments.

Figure 3:
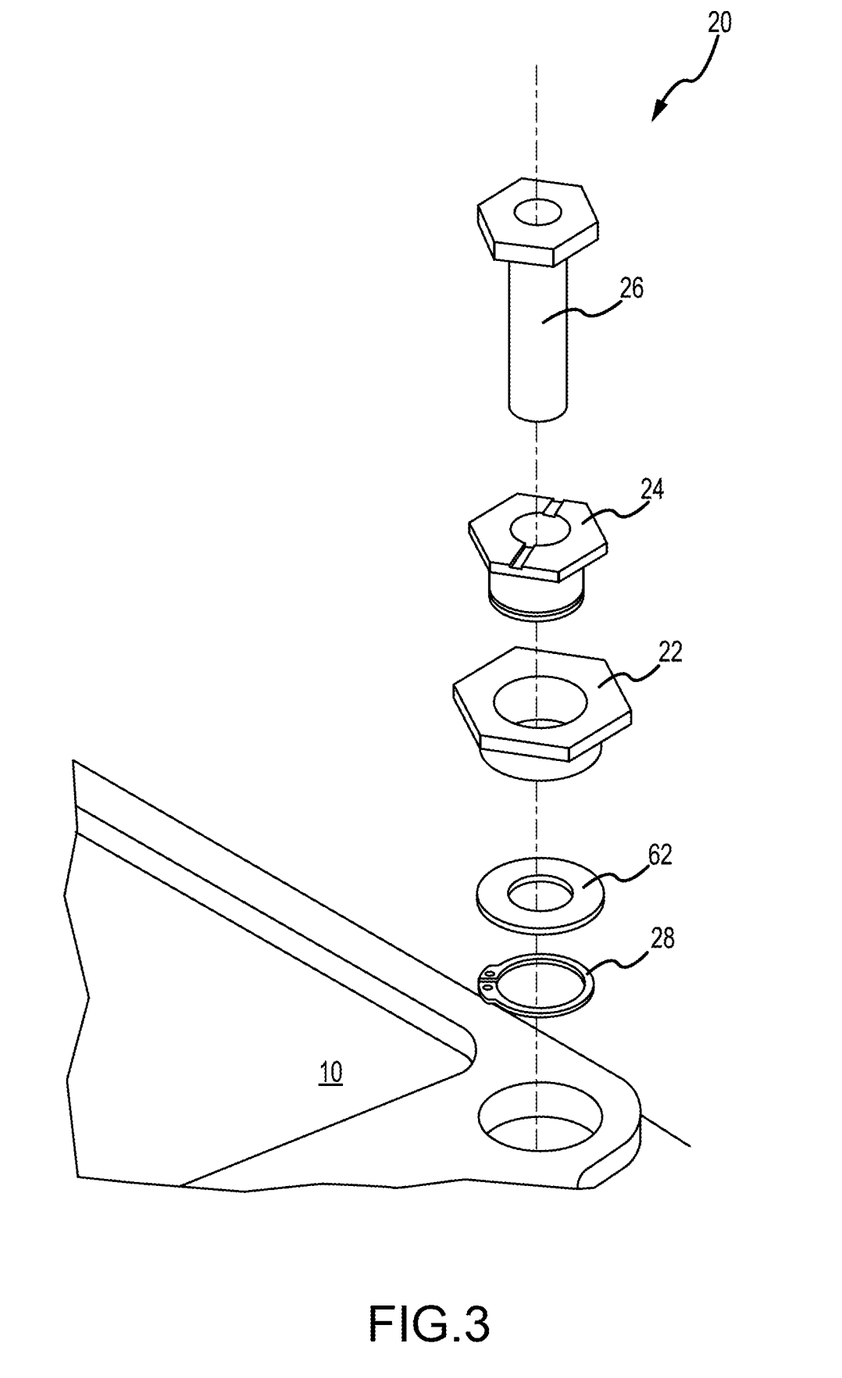
FIG. 3 illustrates an assembly view of the fastener aligning joint arrangement of FIG. 1A, in accordance with various embodiments.

With reference to FIG. 3, an assembly view of fastener aligning joint 20 is illustrated, in accordance with various embodiments.

Figure 4:
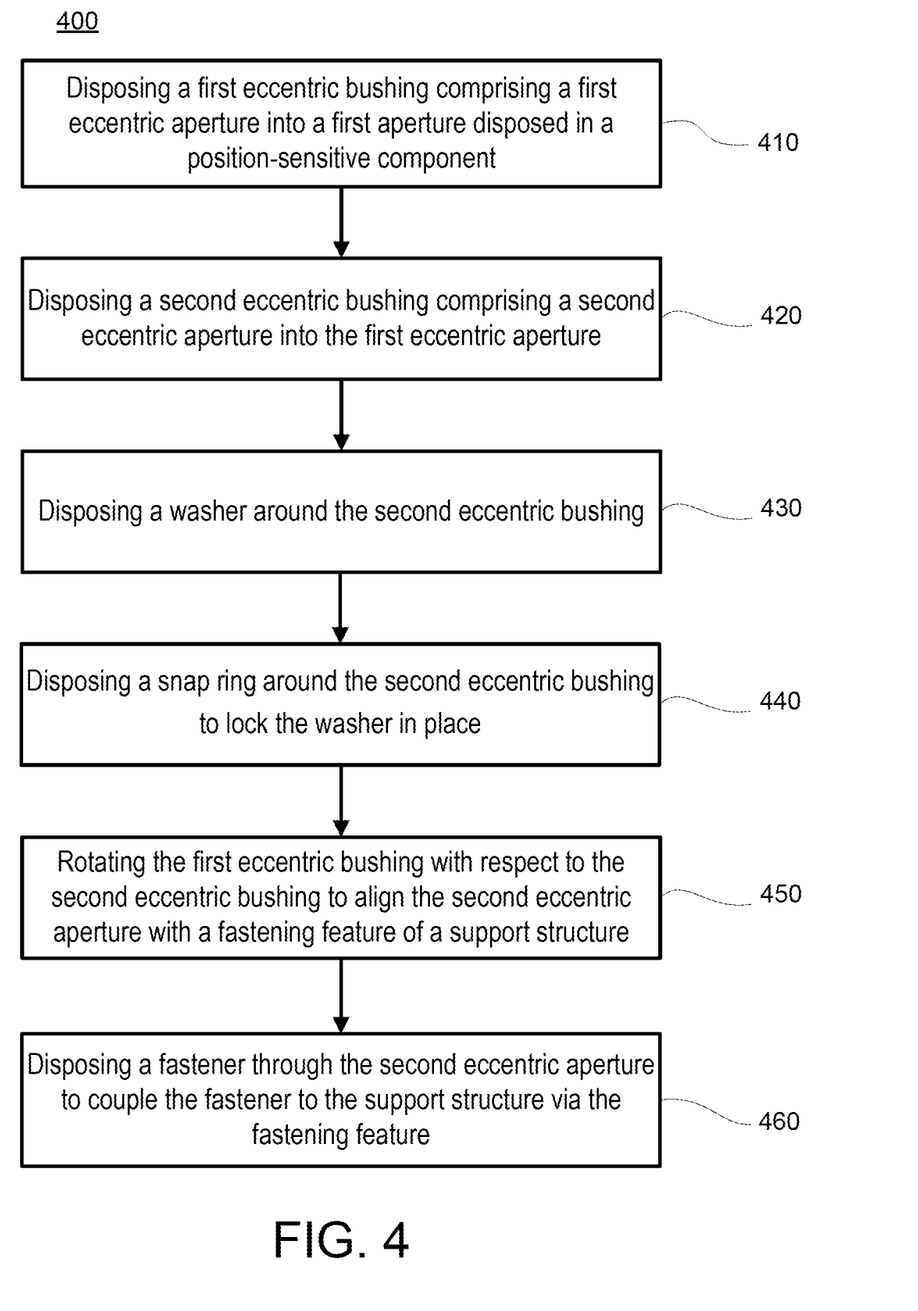
FIG. 4 illustrates a flow chart for a method for installing a multi-hole component, in accordance with various embodiments.

With reference to FIG. 4, a flow chart for a method 400 for installing a component is illustrated, in accordance with various embodiments. Method 400 includes disposing a first eccentric bushing comprising a first eccentric aperture into a first aperture disposed in the component (step 410). Method 400 includes disposing a second eccentric bushing comprising a second eccentric aperture into the first eccentric aperture (step 420). Method 400 includes disposing a washer around the second eccentric bushing (step 430). Method 400 includes disposing a snap ring around the second eccentric bushing to lock the washer in place (step 440). Method 400 includes rotating the first eccentric bushing with respect to the second eccentric bushing to align the second eccentric aperture with a fastening feature of a support structure (step 450). Method 400 includes disposing a fastener through the second eccentric aperture to couple the fastener to the support structure via the fastening feature (step 460).

With combined reference to FIG. 1C and FIG. 4, step 410 may include moving first eccentric bushing 22 into aperture 42. Step 420 may include moving second eccentric bushing 24 into first eccentric aperture 42. Step 430 may include disposing washer 62 around the second eccentric bushing 24. Step 440 may include disposing a snap ring 28 around the second eccentric bushing 24 to lock the washer 62 in place (i.e., in the installed position around shaft portion 56). Step 450 may include rotating the first eccentric bushing 22 with respect to the second eccentric bushing 24 to align the second eccentric aperture 46 with aperture 32. Step 460 may include disposing fastener 26 through the second eccentric aperture 46 and into aperture 32 to couple the fastener 26 to the support structure 30 via aperture 32. Fastener 26 may be tightened to compress head flange 54 and head flange 58 between head flange 50 and panel member 10. Fastener 26 may be tightened to compress head flange 54, head flange 58, and panel member 10 between head flange 50 and support structure 30.

Figure 5:
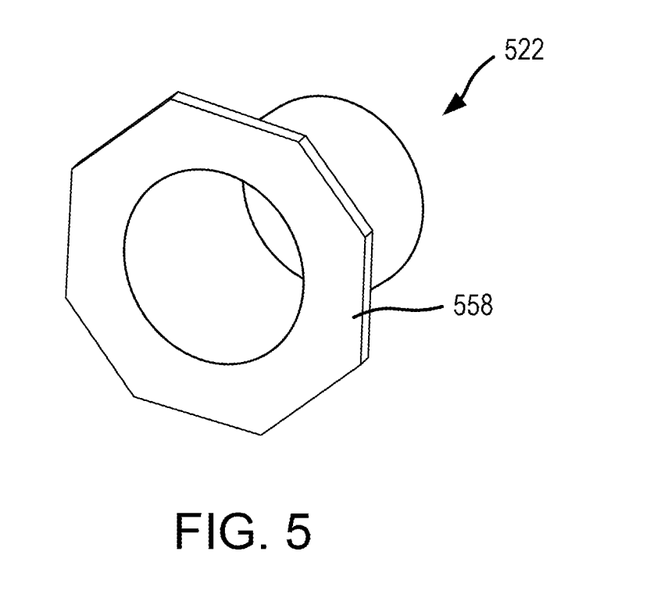
FIG. 5 illustrates a perspective view of an eccentric bushing comprising a rotation assistance feature comprising a pair of opposing parallel surfaces, in accordance with various embodiments.
Figure 6A:
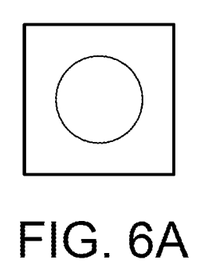
FIG. 6A, FIG. 6B, and FIG. 6C illustrate various geometries for a rotation assistance feature, in accordance with various embodiments.
Figure 6B:
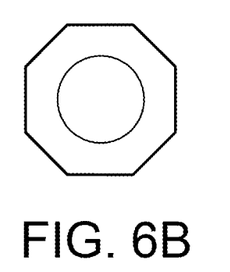
Figure 6C:
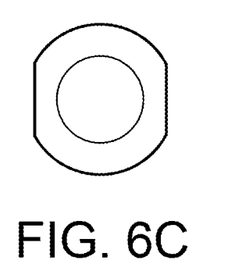

With reference to FIG. 5, a first eccentric bushing 522 is illustrated, in accordance with various embodiments. First eccentric bushing 522 may be similar to first eccentric bushing 22 of FIG. 1A through FIG. 3. Head flange 558 may exhibit an octagonal geometry having a plurality of opposing parallel surface pairs, though in various embodiments head flange 558 may exhibit other geometries comprising one or more pairs of opposing parallel surfaces such as a square geometry (see FIG. 6A), a hexagonal geometry (see FIG. 6B), a round geometry with opposing parallel surfaces cut into the outer diameter surface (see FIG. 6C), or any other geometry suitable for receiving or being captured by a tool for turning first eccentric bushing 522.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A fastener aligning joint arrangement, comprising:
   a first component comprising an oversized aperture;
   a first eccentric bushing comprising a first eccentric aperture and a first head flange, the first component is configured to receive the first eccentric bushing in the oversized aperture;
   a second eccentric bushing comprising a second eccentric aperture, a second head flange and a second shaft portion extending from the second head flange, wherein the second eccentric aperture extends through the second head flange and the second shaft portion, and the first eccentric bushing is configured to receive the second eccentric bushing in the first eccentric aperture;
   a fastener, the second eccentric bushing is configured to receive the fastener in the second eccentric aperture;
   a washer configured to be received around a portion of the second eccentric bushing;
   a snap ring configured to be received around the portion of the second eccentric bushing to secure the washer in an installed position and wherein the washer and the snap ring axially lock the second eccentric bushing within the oversized aperture with the first head flange against the first component; and
   a second component comprising a fastening aperture, wherein the fastener is configured to be threadingly coupled to the fastening aperture.

2. The fastener aligning joint arrangement of claim 1, wherein rotation of at least one of the first eccentric bushing with respect to the first component or the second eccentric bushing with respect to the first eccentric bushing is configured to align the fastener within the oversized aperture.

3. The fastener aligning joint arrangement of claim 2, wherein the first eccentric bushing comprises a first shaft portion extending from the first head flange, wherein the first eccentric aperture extends through the first head flange and the first shaft portion.

4. The fastener aligning joint arrangement of claim 3, wherein rotation of at least one of the first eccentric bushing with respect to the first component or the second eccentric bushing with respect to the first eccentric bushing is configured to align the fastener with the fastening aperture.

5. The fastener aligning joint arrangement of claim 4, wherein the first component comprises a depression and the snap ring and the washer are disposed in the depression.

6. The fastener aligning joint arrangement of claim 4, wherein the fastener is configured to be tightened to compress the first head flange, the second head flange, and the first component between the fastener and the second component.

7. The fastener aligning joint arrangement of claim 3, wherein the first head flange of the first eccentric bushing comprises a pair of parallel opposing surfaces configured to receive a first tool for at least one of securing the first eccentric bushing in a first given rotational position or rotating the first eccentric bushing between a first rotational position and a second rotational position.

8. The fastener aligning joint arrangement of claim 7, wherein the second head flange of the second eccentric bushing comprises a slot configured to receive a second tool for at least one of securing the second eccentric bushing in a second given rotational position or rotating the second eccentric bushing between a third rotational position and a fourth rotational position.

9. A double eccentric bushing arrangement, comprising:
a first component;
a first eccentric bushing comprising a first eccentric aperture and a first head flange;
a second eccentric bushing comprising a second eccentric aperture, a second head flange and a second shaft portion extending from the second head flange, wherein the second eccentric aperture extends through the second head flange and the second shaft portion, and the first eccentric bushing is configured to receive the second eccentric bushing in the first eccentric aperture;
a threaded fastener, the second eccentric bushing is configured to receive the threaded fastener in the second eccentric aperture;
a washer configured to be received around a portion of the second eccentric bushing; and
a snap ring configured to be received around the portion of the second eccentric bushing to secure the washer in an installed position and wherein the washer and the snap ring axially lock the second eccentric bushing within the first component with the first head flange against the first component.

10. The double eccentric bushing arrangement of claim 9, wherein rotation of the first eccentric bushing with respect to the second eccentric bushing is configured to align the second eccentric aperture with a fastening aperture of an adjacent component.

11. The double eccentric bushing arrangement of claim 10, wherein the first eccentric bushing comprises a first shaft portion extending from the first head flange, wherein the first eccentric aperture extends through the first head flange and the first shaft portion.

12. The double eccentric bushing arrangement of claim 11, wherein the first head flange of the first eccentric bushing comprises a pair of parallel opposing surfaces configured to receive a first tool for at least one of securing the first eccentric bushing in a first given rotational position or rotating the first eccentric bushing between a first rotational position and a second rotational position.

13. The double eccentric bushing arrangement of claim 12, wherein the second head flange of the second eccentric bushing comprises a slot configured to receive a second tool for at least one of securing the second eccentric bushing in a second given rotational position or rotating the second eccentric bushing between a third rotational position and a fourth rotational position.

14. The double eccentric bushing arrangement of claim 13, wherein the second shaft portion comprises a circumferential groove configured to receive the snap ring.

15. A method for installing a component, comprising:
disposing a first eccentric bushing comprising a first eccentric aperture and a first head flange into a first aperture disposed in the component;
disposing a second eccentric bushing comprising a second eccentric aperture, a second head flange, and a second shaft portion extending from the second head flange, wherein the second eccentric aperture extends through the second head flange and the second shaft portion, into the first eccentric aperture;
disposing a washer around the second eccentric bushing;
disposing a snap ring around the second eccentric bushing to lock the washer in an installed position and wherein the washer and the snap ring axially lock the second eccentric bushing within the first aperture of the component with the first head flange against the component;
rotating the first eccentric bushing with respect to the second eccentric bushing to align the second eccentric aperture with a fastening aperture of a support structure; and
disposing a fastener through the second eccentric aperture to couple the fastener to the support structure via the fastening aperture.

16. The method of claim 15, wherein rotating the first eccentric bushing with respect to the second eccentric bushing comprises:
moving a first tool around the first head flange of the first eccentric bushing; and
moving a second tool into a slot disposed in the second head flange of the second eccentric bushing.

17. The method of claim 16, wherein the first head flange comprises a pair of opposing parallel surfaces configured to engage the first tool.

* * * * *